United States Patent
Kang

(10) Patent No.: US 6,695,332 B1
(45) Date of Patent: Feb. 24, 2004

(54) BICYCLE TRANSMISSION DEVICE FOR UNIDIRECTIONAL OUTPUT FROM BI-DIRECTIONAL INPUT

(76) Inventor: Heo Hyun Kang, 63-47, Majiri, Jeoksungmeon, Pajusi, Kyungkido 413-910 (KR)

( * ) Notice: Subject to any disclaimer, the term of this patent is extended or adjusted under 35 U.S.C. 154(b) by 0 days.

(21) Appl. No.: 10/129,138

(22) PCT Filed: Aug. 31, 2000

(86) PCT No.: PCT/KR00/00989

§ 371 (c)(1),
(2), (4) Date: May 15, 2002

(87) PCT Pub. No.: WO01/36259

PCT Pub. Date: May 25, 2001

(30) Foreign Application Priority Data

Nov. 15, 1999 (KR) .......................... 1999-24967

(51) Int. Cl.$^7$ ................................ B62M 9/06
(52) U.S. Cl. ...................... 280/237; 280/260; 280/261; 280/238
(58) Field of Search ................ 280/259, 258, 280/236, 237, 238, 252, 253, 261, 260; 74/594.1, 594.2

(56) References Cited

U.S. PATENT DOCUMENTS

| | | | |
|---|---|---|---|
| 5,884,927 A | * 3/1999 | Mahaney et al. | 280/237 |
| 5,918,894 A | * 7/1999 | Toronto et al. | 280/237 |
| 5,970,822 A | * 10/1999 | Jung et al. | 74/810.1 |
| 6,390,487 B1 | * 5/2002 | Yoo | 280/237 |
| 6,419,252 B1 | * 7/2002 | Park et al. | 280/237 |

* cited by examiner

Primary Examiner—Lesley D. Morris
Assistant Examiner—Tony Winner
(74) Attorney, Agent, or Firm—Hoffman, Wasson & Gitler

(57) ABSTRACT

A bicycle with a forward and backward pedaling system which drives a bicycle forward in either a forward or a backward pedaling.

A forward and backward pedaling bicycle which comprises a backward driving sprocket 6 which is installed on a driving shaft 5 for a load driving in forward direction but a no-load driving in backward direction; a forward driving sprocket 7 which is installed on the driving shaft 5 for a load driving in forward direction but a no-load driving in backward direction, and connects an upward induction sprocket 12 which is installed for a no-load driving on the top of a support part 10 that is placed along the top of the backward driving sprocket 6 and a rearward induction sprocket 16 which is connected to a rearward driving shaft 15 for a no-load driving and is placed at the bottom of a support part 10 that is placed along the lower rear direction of the upward induction sprocket 12 with a driving chain 8; and an auxiliary induction sprocket 17 which is installed on the rearward driving shaft 15 for a no-load driving, and the forward driving sprocket 7 and the auxiliary induction sprocket 17 are connected by an auxiliary chain.

The bicycle can move forward in a backward pedaling as well as in a forward pedaling. Therefore, one can ride on a bicycle for an extended period while changing posture, can climb up a hill with reduced power consumption by pedaling in a backward direction. This device is simply applicable to all bicycles, and is practical and useful.

4 Claims, 3 Drawing Sheets

BICYCLE TRANSMISSION DEVICE FOR UNIDIRECTIONAL OUTPUT FROM BI-DIRECTIONAL INPUT

INTRODUCTION

This invention relates to a bicycle with a forward and backward pedaling system which drives a bicycle forward in either a forward or a backward pedaling.

BACKGROUND

Generally, bicycles which are widely used in transportation and exercises are driven by the pedaling action which is relayed on to a rear wheel and trigger the wheel roll forward.

However, since the conventional bicycles are designed to be driven only by a forward pedaling, they are physically more demanding to drive and do not provide a balanced exercise effect.

In other words, because the existing bicycles which are driven by the power generated by footing down the pedal require repeated motion of forward pedaling, cause stress and fatigue in legs and fail to provide a balanced exercise effect in muscles due to the one-directional muscle movement.

The uphill riding with an existing bicycle has been especially challenging because during which the rider has to pedal against one's body weight, which is physically demanding and often causes an uncomfortable posture of pedaling, thus making the rider easily exhausted.

Besides, stopping in the middle of climbing a hill often leads the bicycle to fall after sliding back, or to roll down rapidly after losing control on pedaling, which can result in a serious accident.

DETAILED DESCRIPTION OF THE INVENTION

The present invention is devised in order to solve the aforementioned problems of the existing bicycles. The object of the present invention is to provide a bicycle which can move forward by either pedaling in a forward or a backward direction, thus enabling an extended riding with reduced fatigue and allowing leg muscles to have a better balanced exercise effect.

Another object of the present invention is to reduce the power load on a bicycle during the uphill riding by a backward pedaling and to prevent a bicycle from sliding back on stop.

PREFERRED EMBODIMENT OF THE INVENTION

The present invention comprises: a backward driving sprocket which is mounted on a driving sprocket with a pedal and a rear wheel shaft for a one-directional rolling; a forward driving sprocket which is installed to the same shaft with the backward driving sprocket and connects by a driving chain an upward induction sprocket and a rearward induction sprocket which is installed on the top and rear sides of the backward driving sprocket, respectively, for a no-load driving; an auxiliary induction sprocket which is mounted on the same shaft with the rearward induction driving shaft; and an auxiliary chain which connects the forward driving sprocket and the auxiliary induction sprocket in a bicycle driven forward by a rolling of a rear wheel by pedaling.

In the present invention, a forward pedaling drives a rear wheel to go forward by a no-load driving of a backward driving sprocket and a driving of a forward driving sprocket which rotates with a rearward induction sprocket through a rolling of a driving sprocket.

In backward pedaling, the forward driving sprocket is in no-load state and the backward driving sprocket rolls to drive the rear wheel in the forward direction.

A detailed account for the structure and the mechanism of the present invention is provided below with reference to the attached figures.

Figure 1:
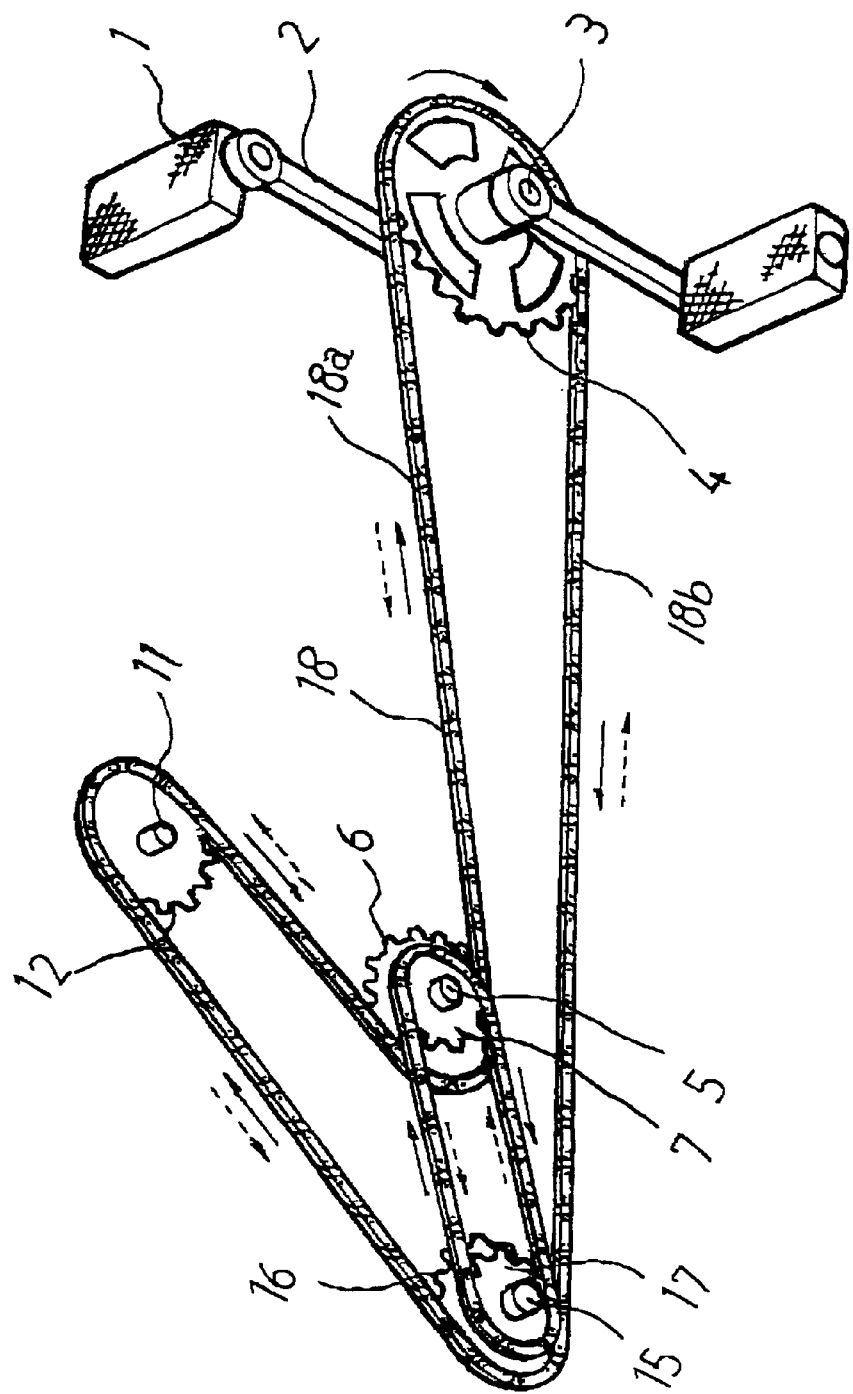
FIG. 1 is a perspective view of a bicycle according to the present invention illustrating its major components.
Figure 2:
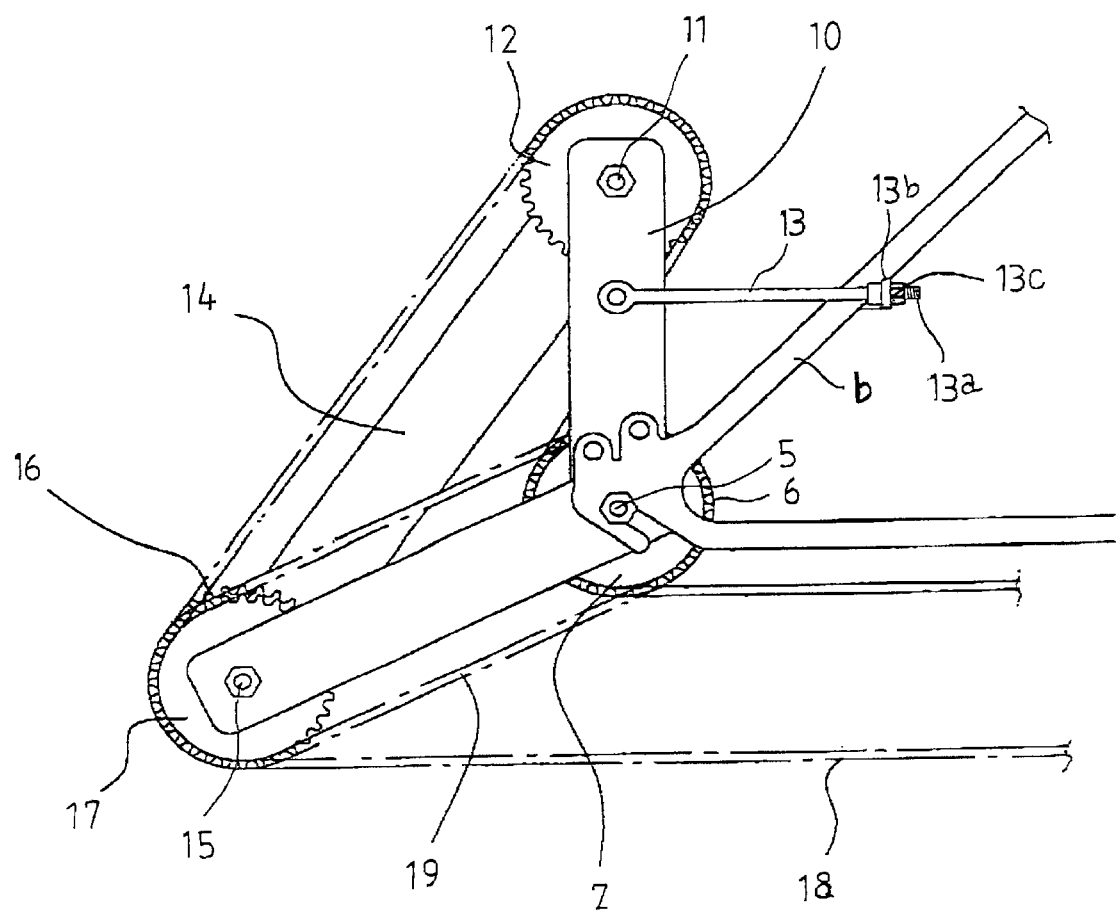
FIG. 2 is a front view of a bicycle according to the present invention illustrating a part of the bicycle.
Figure 3:
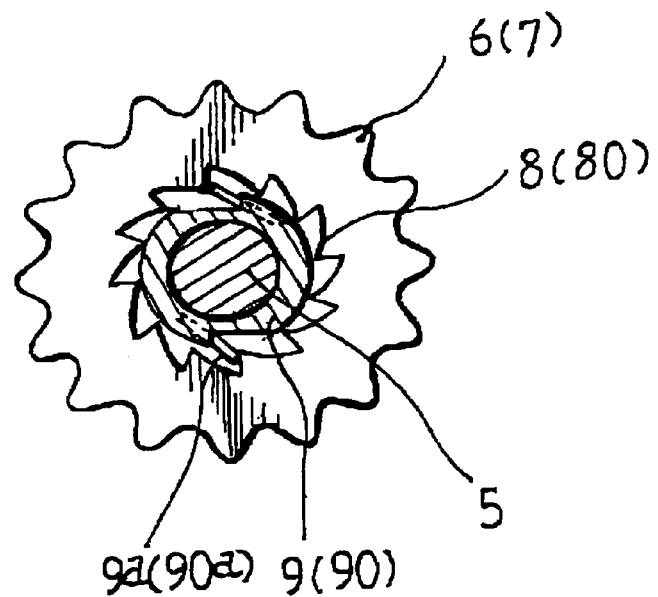
FIG. 3 is a skewed cross-sectional view of a bicycle according to the present invention illustrating the connection mechanism of the forward driving sprocket and the backward driving sprocket.
Figure 4:
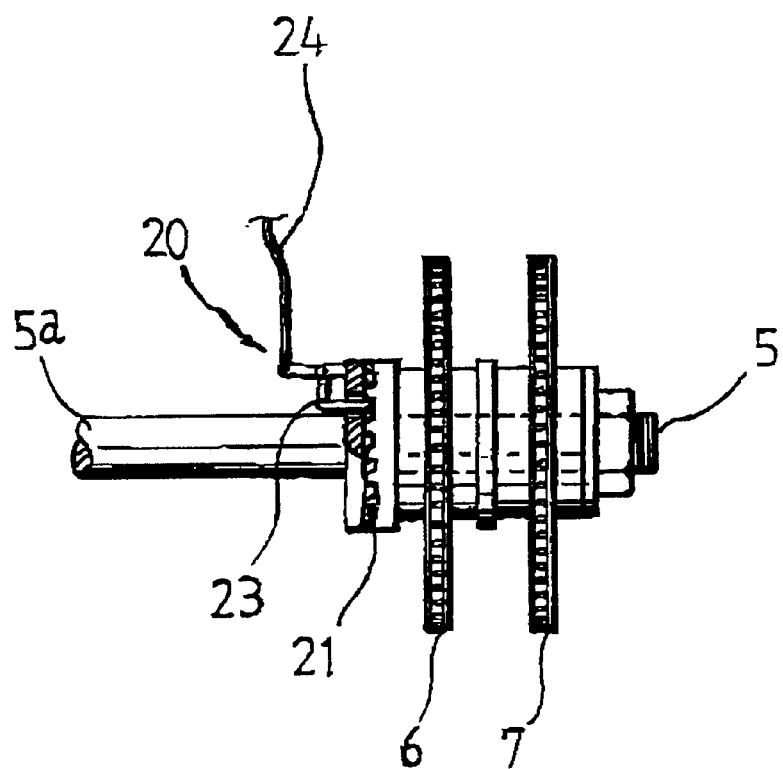
FIG. 4 is a side view of a cross section of a clutch part of a bicycle according to the present invention.

FIG. 1 is a perspective view of a bicycle according to the present invention illustrating its major components. FIG. 2 is a front view of a bicycle according to the present invention illustrating a pail of the bicycle. FIG. 3 is a skewed cross-sectional view of a bicycle according to the present invention illustrating the connection mechanism of the forward driving sprocket and the backward driving sprocket. FIG. 4 is a side view of a cross section of a clutch pail of a bicycle according to the present invention.

As shown in FIG. 1, the present invention installs a crank 2 to which two pedals I are attached atop and below, respectively, to a driving shaft 3, at which a driving sprocket 4 is anchored.

A backward driving sprocket 6 and a forward driving sprocket 7 are installed in a rear wheel shaft 5 as individual units, so that when either one of them rotates in the forward direction the respective sprocket is engaged in the driving operation but the backward rotation of each sprocket results in the idling of the respective sprocket which causes it to be disconnected from the driving shaft.

The arrangement of the backward driving 6 and the forward driving 7 sprockets installed at the rear wheel shaft 5 is as illustrated in FIG. 3.

As shown in FIG. 3, a one-directional gear 8 is formed at the center of the inside of the backward driving sprocket 6. A one-directional supporting part 9 with projected elastic latch 9a on its rim is placed inside the one-directional gear 8, so that the latch 9a is caught on a tooth of the one-directional gear 8. The aforementioned driving shaft 5 is fixed by inserting it in the center of the inside of the one-directional driving part 9.

Also, a one-directional gear 80 is formed at the center of the inside of the forward driving sprocket 7. A one-directional supporting part 90 with a projected elastic latch 90a on its rim is placed inside a one-directional gear 80, so that the latch 90a is caught on a tooth of the one-directional gear 80. The aforementioned driving shaft 5 is fixed by inserting it in the center of the inside of the one-directional driving part 9, so that the forward driving sprocket 7 and the backward driving sprocket are installed on the driving shaft 5.

As illustrated in FIG. 2, the upward induction sprocket 12 is installed for a no-load driving at the aforementioned upward driving shaft 11 which is formed at the top portion of a support part 10 that is flowingly connected to the bottom portion of the driving shaft 5. In the present invention, there is an expansion lever 13, one end of which is flowingly connected to the support part 10 and the other end of which has a thread part 13a, so that the thread part 13a passes through a support cut 13b fixed on a bicycle body b and meets with a nut 13c.

As illustrated in FIG. 1, there is a rearward driving shaft 15 at the bottom of the support pail 14 the top of which connects to the upward driving shaft 11. A rearward induction sprocket 16 and an auxiliary induction sprocket 17 are installed at the rearward driving shaft for a no-load driving.

As explained above the driving chain 18 and the auxiliary chain 19 are connected to the corresponding sprockets when each sprocket is installed. The driving sprocket 4, the backward driving sprocket 6, the upward induction sprocket and the rearward induction sprocket 16 are connected consecutively by a driving chain 18 by extending and supporting the top of the driving chain 18 which is supported by being caught on a forward tooth of driving sprocket 4 to the lower tooth of the backward driving sprocket 6; extending the chain to the top and supporting it on the upper tooth of the upward induction sprocket 12; extending the chain to the bottom and supporting it on the lower tooth of the rearward induction sprocket 16; and extending the chain to the forward and supporting it on the tooth of the driving sprocket 4.

Furthermore, the forward driving sprocket 7 and the auxiliary induction sprocket 17 are connected by an auxiliary chain 19.

As illustrated in FIG. 4, a clutch pail 20 is installed on the driving shaft 5 and a rear wheel shaft 5a to transmit or to disconnect the power of the backward driving sprocket 6 and the forward driving sprocket 7 to the driving shaft. The clutch part 20 fixes a clutch gear 21 to the one-directional driving part 9, links a resting bulb 23 which bounces by a spring to a clutch gear 21, and connects the top portion of a wire 24 which is attached along the outside of the resting bulb 23 to a handle of a clutch (not shown in the figure) installed on a bicycle handgrip.

Hereinafter, the function of the bicycle thus constructed is explained.

The bicycle according to the present invention is driven forward by a rider who sits on a saddle, holds a handle, treads on pedals in a conventional method, and especially on a bicycle which moves forward either by a forward pedaling or by a backward pedaling.

That is, when a rider treads a pedal I forward, the driving sprocket rotates clockwise, or forward, and thereafter the upper line 18a of the driving chain 18 connected to the power sprocket 4 moves forward. The backward driving sprocket 6 has a no-load rotation to a counterclockwise, or backward by the movement of the driving chain 18, and the driving chain 18 changes directions from the bottom part to top part back to rear bottom part, and causes the rearward induction sprocket 16 to rotate clockwise, or forward according to the rotation of the upward induction sprocket 12.

By the rotation of the rearward induction sprocket 16 and the auxiliary induction sprocket 17 fixed on a rear driving shaft 15 in the same direction, the auxiliary chain 19 moves and the forward driving sprocket 7 rotates clockwise, or forward.

When the forward driving sprocket 7 rotates forward, the driving shaft rotates with it, which causes the rear wheel connected to the driving shaft 5 to move clockwise, or forward and the bicycle heads forward.

Furthermore, when a rider feels fatigue in climbing uphill by pedaling forward, the rider can still drive forward by a backward pedaling.

In other words, when a rider treads a pedal 1 backward, the driving sprocket rotates counterclockwise, or backward, and thereafter the lower line 18b of a driving chain 18 connected to the power sprocket 4 moves forward. The rearward induction sprocket 16 rotates to a counterclockwise, or backward by the movement of the driving chain 18, and the auxiliary chain 19 moves by the rotation of the auxiliary induction sprocket 17 fixed on the rearward auxiliary shaft 15 in the same direction with the rearward induction sprocket 16 and causes the forward driving sprocket 7 to have a no-load rotation in a counterclockwise direction, or backward.

According to the rearward rotation of the rearward induction sprocket 16, the upper induction sprocket 12 rotates in the same direction. The driving chain 18 which changes directions by the upper induction sprocket 12 rotates the backward driving sprocket 12 in a clockwise direction, or forward, which transmits the driving power of the backward driving sprocket 6 to the driving shaft 5 and a bicycle moves forward by the clockwise or forward driving of a rear wheel.

The backward driving sprocket 6 and the forward driving sprocket 7 rotate in the opposite directions. As shown in FIG. 3, in a clockwise or a forward rotation, the latch 9a is supported by a one-directional gear 8 and transmits the driving power to the driving shaft 5. In a counterclockwise or a backward rotation, the latch 9a is disconnected from the one-directional gear 8 and disconnects the driving power from the driving shaft 5. In a forward pedaling, the backward driving sprocket 6 has a no-load driving, and power is transmitted by the forward driving sprocket 7. In a backward pedaling, the forward driving sprocket 7 has a no-load driving, and power is transmitted by the backward driving sprocket 6. This process makes the rear wheel to move forward in either pedaling direction, and power is constantly loaded on the rear wheel, therefore prevents an unexpected backward sliding. Furthermore, light upward and downward kicking on a pedal without a full rotation can drive a bicycle forward.

In addition, the adjustment of a nut 13c of the expansion lever 13 can move the support part 10 left and right, which enables each sprocket especially the power sprocket 4 to keep tension on the driving chain 18 through the backward driving sprocket 6 when pedaling backward. It is desirable to keep tension in the whole driving chain 18 by adjusting the position of the support part 10.

As described in FIG. 4, the driving shaft 5 can be connected to or disconnected from the rear wheel shaft 5a. In a normal condition, the clutch gear 21 is fixed to the resting bulb 23 by the pressure of a spring, and the driving shaft 5 is connected to the rear wheel axis 5a.

Besides, if a rider controls the clutch handle, and pulls the wire 24 upward, then the resting bulb 23 is displaced and disconnected from the clutch gear 21, which causes separation of the driving shaft 5 from the rear wheel shaft 5a. When a rider wants to move a bicycle backward, the rear wheel does not move backward while the driving shaft 5 is connected to the rear wheel shaft 5a. So, the clutch handle must be controlled to disconnect the driving shaft 5 from the rear wheel shaft 5a in order for a no-load driving of the rear wheel for a backward movement.

INDUSTRIAL APPLICABILITY

As described above, in the present invention a bicycle can move forward in either a forward or a backward pedaling, which reduces rider's fatigue through a balanced pedaling and allows uniform development of leg muscles.

Furthermore, in uphill climbing the weight of a rider will be leaned backward, therefore backward pedaling will allow the forward driving with reduced power than a forward pedaling.

In addition, the driving shaft rotating the rear wheel is loaded either by a forward driving sprocket or by a backward driving sprocket, therefore a bicycle rider will not experience an unexpected backward sliding.

Still furthermore, a seesaw type pedaling without a full rotation of a pedal can drive a bicycle forward, which allows a low speed driving with minimized power.

As is explained, the present invention can be achieved by simply attaching an apparatus to a conventional bicycle without a comprehensive modification of a bicycle. Additional attachment of an existing gear shifter will enhance its performance. On the whole the present invention provides an easily applicable and performance enhancing effects to all bicycles.

What is claimed is:

1. A forward and backward pedaling bicycle which comprises:

a backward driving sprocket 6 which is mounted on a driving shaft 5 for a load driving in forward direction but a no-load driving in backward direction;

a forward driving sprocket 7 which is mounted on the driving shaft 5 for a load driving in forward direction but a no-load driving in backward direction, and connects an upward induction sprocket 12 which is installed for a no-load driving on a top of a support part 10 that is placed along the top of the backward driving sprocket 6 and a rearward induction sprocket 16 which is connected to a rearward driving shaft 15 for a no-load driving and is placed at a bottom of the support part 10 that is placed along the lower rear direction of the upward induction sprocket 12 with a driving chain 8; and an auxiliary induction sprocket 17 which is mounted on the rearward driving shaft 15 for a no-load driving, and the forward driving sprocket 7 and the auxiliary induction sprocket 17 are connected by an auxiliary chain in a bicycle driven by the transmission of a driving power of a power sprocket 4 mounted with a pedal 1 to a rear wheel by a chain.

2. A forward and backward pedaling bicycle according to claim 1, wherein the backward driving sprocket 6 and the forward driving sprocket 7 form a one-directional gear 8, 80, a latch 9a, 90a is placed to be caught on a tooth of the one-directional gear 8, 80 by arranging the one-directional driving part 9, 90 with a projected latch 9a, 90a in the inside of the one-directional gear 8, 80, and the driving shaft 5 is fixed by inserting into the center of the inside of the one-directional driving part 9, 90.

3. A forward and backward pedaling bicycle according to claim 1, wherein the support part 10 can be controlled by an expansion lever 13.

4. A forward and backward pedaling bicycle according to claim 1, wherein the driving shaft 5 and a rear wheel shaft 5a are either connected or disconnected by a clutch.

* * * * *